(12) United States Patent
Petrichkovich et al.

(10) Patent No.: US 10,356,385 B2
(45) Date of Patent: Jul. 16, 2019

(54) METHOD AND DEVICE FOR STEREO IMAGES PROCESSING

(71) Applicant: Stock Company Research and Development Center "Electronic Information Computation Systems", Moscow (RU)

(72) Inventors: Yaroslav Petrichkovich, Moscow (RU); Vladimir Gusev, Moscow (RU); Vitaliy Lotorev, Moscow (RU); Iuliia Reshetnikova, Moscow (RU); Aleksandr Andreev, Moscow (RU); Tatiana Solokhina, Moscow (RU); Andrey Belyaev, Moscow (RU); Anatoly Khamukhin, Moscow (RU); Anton Leontiev, Moscow (RU); Dmitriy Frolov, Moscow (RU); Denis Kuznetsov, Moscow (RU); Fedor Putrya, Moscow (RU); Aleksandr Funkner, Moscow (RU); Leonid Menshenin, Moscow (RU)

(73) Assignee: Stock Company Research and Development Center "Electronic Information Computation Systems", Moscow (RU)

( * ) Notice: Subject to any disclaimer, the term of this patent is extended or adjusted under 35 U.S.C. 154(b) by 46 days.

(21) Appl. No.: 15/615,507

(22) Filed: Jun. 6, 2017

(65) Prior Publication Data
US 2017/0353708 A1    Dec. 7, 2017

(30) Foreign Application Priority Data

Jun. 7, 2016  (RU) .................................. 2016122379

(51) Int. Cl.
*H04N 13/128* (2018.01)
*H04N 13/122* (2018.01)
(Continued)

(52) U.S. Cl.
CPC ............. *H04N 13/128* (2018.05); *G06T 7/97* (2017.01); *H04N 13/122* (2018.05); *H04N 2013/0081* (2013.01)

(58) Field of Classification Search
None
See application file for complete search history.

(56) References Cited

U.S. PATENT DOCUMENTS 5,414,780 A * 5/1995 Carnahan ................ G06F 17/14
358/403
5,586,258 A * 12/1996 Conterno ............. G06F 15/163
710/100

(Continued)

FOREIGN PATENT DOCUMENTS

RU      2012126548 A    12/2013
WO   WO-2009061305 A1 *  5/2009  .............. G06T 5/50
WO   WO 2014152254 A2    9/2014

OTHER PUBLICATIONS

Vincent Nozick. Multiple View Image Rectification. 1st IEEE-International Symposium on Access Spaces (IEEE-ISAS'11), Jun. 2011, Japan. pp. 277-282, 2011, <hal-00622515>(Year: 2011).*

*Primary Examiner* — Michelle M Entezari
(74) *Attorney, Agent, or Firm* — Arent Fox LLP

(57) ABSTRACT

The present invention is related to the processing of stereo pairs (images obtained simultaneously from two cameras), namely, to methods and devices for processing stereo images. The technical result of the invention is creation of a method and a device for processing high-resolution stereo images with improved efficiency (performance) using a limited amount of memory with the help of a hardware (Continued)

accelerator for calculating the disparity map using a semi-global stereo matching algorithm with three-stage post processing (peak detection, interpolation and median filtering), which requires placing only a few strings (from 4 to 24 at different stages of calculating) in the local memory, which allows to obtain a high-quality disparity map in real time, and also by placing programmable cores of signal processors into the device, which prepare data for calculating the disparity map (rectification of images) and final processing of data using video analytics algorithms, and the hardware accelerator, which minimizes the transfer between external memory and the device, since the left and right images are fully loaded only once, and the results of the processing are data structures of a much smaller volume.

16 Claims, 8 Drawing Sheets

(51) Int. Cl.
  *H04N 13/00* (2018.01)
  *G06T 7/00* (2017.01)

(56) References Cited

U.S. PATENT DOCUMENTS

| | | | | |
|---|---|---|---|---|
| 5,963,344 A * | 10/1999 | Morita | | H04N 5/3692 |
| | | | | 348/E3.027 |
| 6,556,315 B1 * | 4/2003 | Kommrusch | | H04N 1/00002 |
| | | | | 358/444 |
| 6,803,951 B1 * | 10/2004 | Matsukawa | | H04N 5/23245 |
| | | | | 348/231.99 |
| 7,643,067 B2 | 1/2010 | Jeon et al. | | |
| 8,369,652 B1 * | 2/2013 | Khosla | | G06K 9/4623 |
| | | | | 382/284 |
| 2004/0125103 A1 * | 7/2004 | Kaufman | | G06T 15/06 |
| | | | | 345/419 |
| 2007/0050563 A1 | 3/2007 | Alsup | | |
| 2010/0315522 A1 * | 12/2010 | Tsurumi | | G06T 3/0075 |
| | | | | 348/222.1 |
| 2011/0007592 A1 * | 1/2011 | Tashiro | | G11C 7/02 |
| | | | | 365/222 |
| 2011/0285701 A1 | 11/2011 | Chen et al. | | |
| 2012/0221795 A1 | 8/2012 | Hoshaku et al. | | |
| 2014/0347374 A1 * | 11/2014 | Hoshino | | G06T 1/20 |
| | | | | 345/506 |
| 2015/0317821 A1 * | 11/2015 | Ding | | G06T 7/00 |
| | | | | 345/420 |
| 2016/0129906 A1 * | 5/2016 | Chen | | B60W 30/08 |
| | | | | 701/70 |
| 2016/0224502 A1 * | 8/2016 | Palmer | | G06F 13/4059 |
| 2016/0260245 A1 * | 9/2016 | DeCell | | G06T 15/06 |
| 2016/0284090 A1 * | 9/2016 | Huang | | G06T 7/593 |
| 2016/0295194 A1 * | 10/2016 | Wang | | H04N 13/218 |
| 2017/0272727 A1 * | 9/2017 | Jiang | | H04N 13/128 |
| 2017/0330308 A1 * | 11/2017 | Chen | | G06T 5/006 |
| 2018/0007350 A1 * | 1/2018 | Liu | | H04N 13/128 |

* cited by examiner

*Fig. 1. Block diagram of the device for stereo image processing*

METHOD AND DEVICE FOR STEREO IMAGES PROCESSING

CROSS REFERENCE TO RELATED APPLICATION

This application is based upon and claims the benefit of priority of the Russian priority application No. 201612239, filed Jun. 6, 2016. The disclosure of the prior application is hereby incorporated by reference herein its entirety.

FIELD OF THE INVENTION

The invention is related to the processing of stereo pairs (images obtained simultaneously from two cameras), namely, to the methods and devices for stereo image processing, including rectification of stereo images, computation and optimization of the disparity map, and implementation of video analytics algorithms based on the disparity map. The invention can be used in video analytics and video surveillance systems.

The active development of technologies allows to improve significantly the quality of the video signal input from various sources by increasing the resolution and frame frequency of the video stream. Most video analytics tasks require real-time video data processing. Solving these problems using universal processors, which process data from external memory source, does not allow to achieve the required data processing speed, and the placement on the memory chip, which is enough to store several high-resolution frames, is not provided by the existing level of VLSI technology.

An effective way to solve the above problems is to create high-performance clusters that use shared local memory of limited capacity to store image fragments and include processor cores and specialized hardware accelerators designed to perform a number of functions used in video analytics algorithms.

DESCRIPTION OF THE PRIOR ART

One knows the image processing system described in the application U.S. 20120221795 A1, which is a cluster of several processors, such as central processing unit (CPU), digital signal processors (DSP), graphics processing unit (GPU), and hardware accelerators. All cluster processors use the local memory, which is divided into clusters having different string lengths. Each cluster can be shared between all processors, used by only one processor or a group of processors. Priorities of processors for accessing memory are programmed.

The use of the local shared memory allows to optimize access to external memory; however, clustering of processors performing different tasks (for example, CPU and DSP) reduces its efficiency for performing tasks of processing stereo images. Moreover, the hardware accelerators used to solve such problems (for example, the accelerator for computing the disparity map) require a very large amount of data and large traffic with the local memory, which is difficult to be optimized only with the length of the string; a more efficient way of traffic optimizing and placing data structures in the local memory is to increase the bus width and use different addressing modes.

U.S. Pat. No. 7,643,067 B2 describes a system and a method for rectification of stereo images that are received from two cameras in real time using a matrix obtained during calibration. The process of rectification is the implementation of a projective image transformation with further interpolation. This transformation helps to remove unwanted camera turns and some perspective distortions.

The distortion model used in the rectification does not include optical distortion. In addition, only one camera is rectified in the system. If you use the proposed algorithm to rectify a stereo pair, you will first need to find the rotation and displacement of one camera from the landmark, and then turn and shift of the other camera from the landmark, which increases the algorithm error.

The closest to the claimed invention is the stereo imaging system described in patent application U.S. 20110285701 A1, which includes a depth map generator and a multi-view image generator for a 3D display. The depth map generator consists of a processor for stereo matching, which calculates disparity values by performing stereo matching of the first and second images using the belief propagation (BP) algorithm, and a depth map generator that computes the depth map for the multi-view generator of images based on disparity values. Data exchange between the stereo matching processor, the controlling processor, and the external memory is performed via a 64-bit system bus.

The stereo matching processor has three stages of the pipeline: in the first stage, data costs of the first tile of image are generated based on matching of the pixels of the first tile of the first image with the pixels of the first tile of the second image; in the second stage, disparity values and outgoing messages to neighbouring tiles are calculated based on the data costs and incoming messages from neighbouring tiles; in the third stage, the disparity values and outgoing messages are stored in the local memory and are then used in the second stage as incoming messages. The local memory of the processor consists of several SRAM blocks, which have a specific purpose (storing the input and output images, disparities, or outgoing messages), and implement the double buffering mechanism. This system is selected as a prototype of the claimed invention.

The disadvantages of the prototype system are as follows. The use of the tile-by-tile processing with the messaging mechanism between tiles makes it possible to obtain a depth map of good quality using a small amount of the local memory, but the drawbacks are the need for two or three iterations of the value recalculation and the absence of the post-processing of the primary map. When using a prototype system for video analytics, a large computing load is placed on the central processor, which leads to the transferring of large amounts of information via the system bus, which reduces system performance.

BRIEF SUMMARY OF THE INVENTION

It is an objective of the claimed invention to create a method and a device for processing high-resolution stereo images with improved efficiency (performance) occupying a limited amount of memory by engaging a hardware accelerator for computation of a disparity map using a semi-global stereo matching algorithm with three-stage post processing (peak detection, interpolation and median filtering) that requires placing only a few strings (from 4 to 24 at different computation stages) in the local memory, which allows to obtain a high-quality disparity map in real time, as well as by placing programmable cores of signal processors in the device that prepare data for computation of the disparity map (rectification of images) and final data processing using video analytics algorithms and a hardware accelerator, which allows to minimize transfers between external memory and the device, since the left and right images are only once fully uploaded into the devices, and the results of the processing are data structures of a much smaller volume.

The task has been solved by creating a method for stereo image processing, in which:
- left and right source images are uploaded line by line using a DMA controller (3) from external memory (2) into the local memory buffers (4);
- left and right source images are processed line by line using the cores (5) of the signal processors, at the same time, their rectification is performed, and the rectified left and right images are written to the local memory buffers (4);
- the disparity map is computed with the help of a hardware accelerator (8) using the rectified left and right images, and it is then written to the local memory buffer (4);
- rectified left and right images are processed with the help of the cores (5) of the signal processors, using video analytics algorithms and the disparity map, and data structures that are written to the local memory are formed (4) and then retrieved via the DMA controller (3) into the external memory (2).

In a preferred embodiment of the method, the local memory buffers (4), in which the images and the disparity map are stored, have a size of several lines of the image and are organized according to the principle of double buffering.

In a preferred embodiment of the method, rectification of the left and right source images is performed, the coordinates of the prototypes of the pixels of the rectified image in the original image are calculated and the brightness of the prototypes of the pixels are calculated by bilinear interpolation over the four neighbouring pixels.

In a preferred embodiment of the method, the disparity map is computed using a semi-global block matching (SGBM) algorithm in two directions, calculating the matching value functions and the accumulating value in each direction, while checking the disparity map of the left image with the disparity map of the right image and performing post-filtration of the disparity map, consisting of three stages: peak detection, interpolation and median filtration.

In a preferred embodiment of the method, synchronization of the devices using the local memory (4) is performed with hardware using an event register.

In a preferred embodiment of the method, the rectification of the left and right source images is performed in parallel.

In a preferred embodiment of the method, the rectification of the left and right source images is performed simultaneously with the correction of the radial and tangential distortions of the first and second order.

In a preferred embodiment of the method, the disparity map is computed, while two lines of the image are concurrently pipelined, with the intermediate results stored in the local memory (4) only for odd lines.

In a preferred embodiment of the method, the detection of peaks in the disparity map is performed in parallel for all pixels in the processing window of a predetermined size.

In a preferred embodiment of the method, the disparity map is interpolated after detecting the peaks by median filtering on the nearest valid pixels of 8 directions with a programmable ray length according to the anisotropic filtering algorithm or major isotropic filtering.

In a preferred embodiment of the method, a median filtering of a dense disparity map is performed in several successive stages, during each of which parallel processing of pixels from several adjacent image lines is performed using a median filter group.

The task has also been solved by creating a stereo image processing device made of several signal processor cores (5) and a hardware accelerator (8) connected via an arbiter (9) to local memory (4), a DMA controller (3), a program cache (6) and a data cache (7), wherein the signal processor cores (5) and the hardware accelerator (8) are connected to an external system interface (11) and are configured to exchange data therethrough under the control of an external central processor (10), and the DMA controller (3), the program cache (6) and the data cache (7) are connected to external memory (4) and are configured to exchange data with it, and
- the arbiter (9) is configured to control the access of the device to the external memory (4);
- the DMA controller (3) is configured to transfer data between the device and the external memory (4) while performing loading of the left and right source images from the external memory (2) line by line into the buffers of the local memory (4);
- the signal processors cores (5) are configured to process line by line the left and right source images, with their rectification and writing of the rectified left and right images to the local memory buffers (4);
- the hardware accelerator (8) is configured to compute the disparity map using rectified left and right images and write it to the local memory buffer (4);
- the signal processors cores (5) are configured to process the rectified left and right images, using video analytics algorithms and disparity maps, while forming the data structure and writing it to the local memory (4);
- the DMA controller (3) is configured to unload the data structure from the local memory (4) to the external memory (2).

In a preferred embodiment of the device, the local memory (4) is organized in the form of banks of the same volume and bit capacity, access to which can be obtained both by transactions to one bank with a bit capacity equal to the bank capacity, and transactions to several banks simultaneously with a bit capacity equal to the total bit capacity of several banks, using two addressing modes managed by the arbiter (9), executed with the possibility of arbitration to each bank independently with fixed priorities.

In a preferred embodiment of the device, the hardware accelerator (8) contains left and right image pipelines comprising a matching cost function calculating unit and a accumulating cost calculating unit that are configured for parallel calculation of the left and right disparity maps or combined into one device for processing the left disparity map, the unit for checking the disparity map of the left image with the help of the disparity map of the right image, a post-processing block of the disparity map, containing a block for peaks detection, an interpolation block and a median filtering unit, as well as a control unit.

In a preferred embodiment of the device, the matching cost function calculation unit is made as an array of similar cells that are configured to process several lines of the image in the pipeline, while the processing time of one pixel can vary several times depending on the maximum disparity value.

In a preferred embodiment of the device, the calculation of the accumulative matching cost in the horizontal and vertical directions is performed by the same blocks consisting of an array of the same cells and a minimum calculating unit; the number of successive processing steps varies depending on the maximum disparity value.

In a preferred embodiment of the device, a block for peak detection is configured as a computing unit, which is a matrix of the computational cells of the same type controlled by a single instruction, multiple data (SIMD) flow, wherein the number of cells corresponds to the number of pixels in the computational window, and each cell is configured to obtain the value of the pixel corresponding to the position of the cell in the computational window, and the values of neighbouring pixels, which are on the left, right, top and bottom, as well as to store current value, which varies as a result of execution of the instructions and upon the completion of the sequence of instructions forming invalidation flags.

In a preferred embodiment of the device, the interpolation unit is configured to perform parallel processing of N pixels of N lines, wherein the maximum length of the rays in all directions is also N.

In a preferred embodiment of the device, the median filtering unit is made in the form of several successive processing steps, each of which performs parallel processing of pixels from several lines.

For a better understanding of the claimed invention, a detailed description thereof will now be given with corresponding graphical materials.

DETAILED DESCRIPTION OF THE INVENTION

Figure 1:
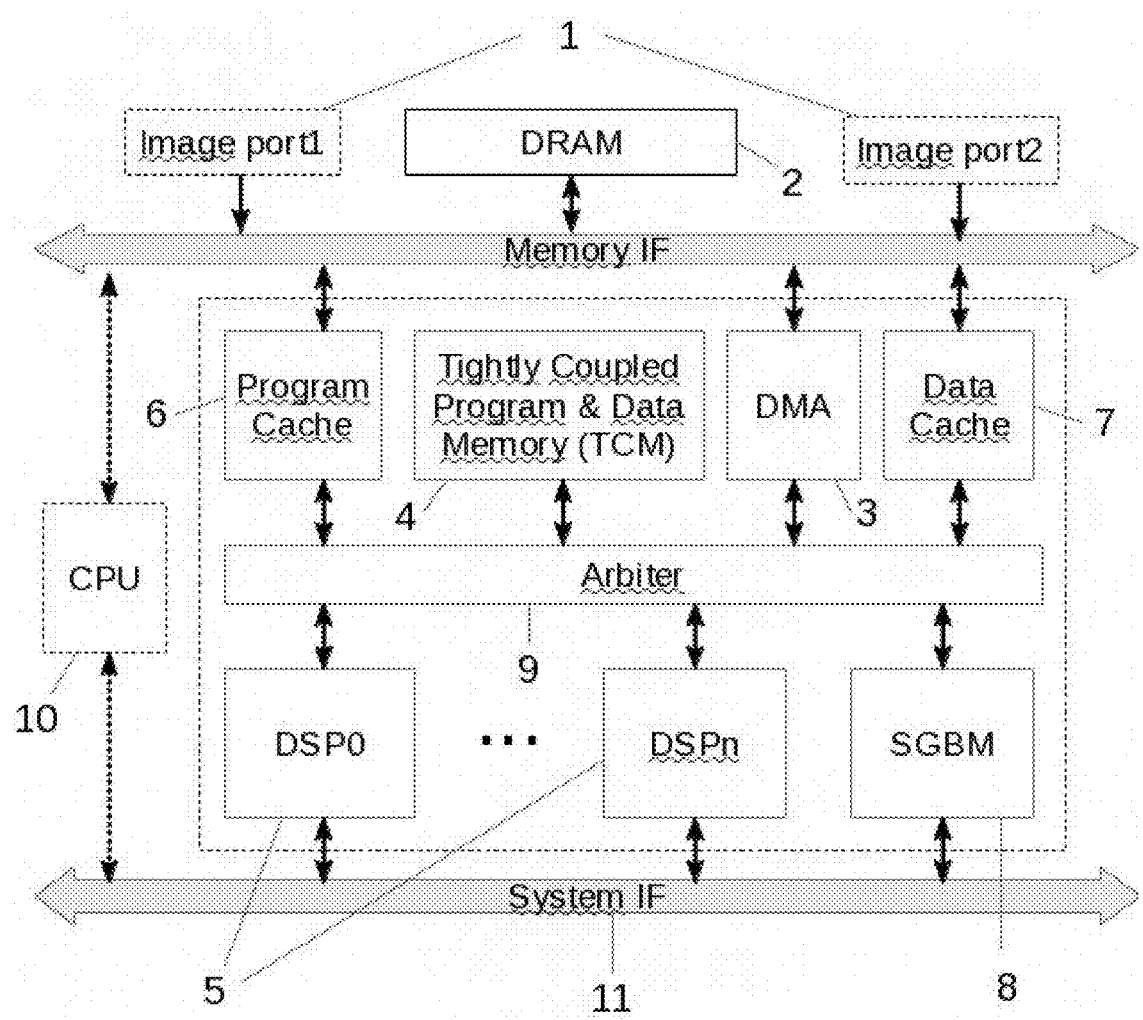
FIG. 1. Block diagram of the stereo image processing device according to the invention.

Let us briefly consider the operation of the claimed method and the device for stereo images processing (FIG. 1).

The claimed device is a computing cluster including several (from 4 to 12) signal processors cores (5) and a hardware accelerator (8) for computing the disparity map. All signal processor cores (5) and the hardware accelerator (8) use a shared local memory (4) for storing programs and intermediate calculation results. The access control of the processor cores (5) and the hardware accelerator (8) to the shared local memory (4) is performed with the help of an arbiter (9).

Data exchange with the external memory (2) is carried out with the help of a DMA controller (3), while a program cache (6) and a data cache (7) are used for temporary data storage. Access to the registers of the cores (5) of the signal processors and the hardware accelerator (8) is performed by a CPU (10) through a system interface (11).

The left and right source images stored in the external memory (2) are processed line by line. Several lines of the left and right source images are read using the DMA controller (3) from the external memory (2) and are stored in the local memory (4). A cluster of the cores (5) of signal processors performs rectification of the image, saving the results in the local memory (4). Using the hardware accelerator (8), the disparity map is computed via a semi-global block matching algorithm (SGBM) with post-filtering, storing intermediate and final results in the local memory (4), and then using the cluster of signal processor cores (5) video analysis is performed via the rectified image and the disparity map. The results are written using the DMA controller to the external memory (2).

Let us consider in detail the operation of an embodiment of the claimed method and the stereo image-processing device shown in FIGS. 1 to 11. The left and right original images obtained from the cameras are received through the image input ports (1), Image Port1 and Image Port2, and are written to the external DRAM memory (2) (FIG. 1).

The DMA controller (3) transfers data between the external memory (2), the local memory (4) and the internal memory of the programs and data of the cores (5) of the DSP0-DSPn signal processors (5). Programs and data can be temporarily stored in the program (6) and data (7) caches. The transmissions are programmed via m (up to 16) independent logical DMA channels. Two channels transfer several lines (minimum 4) of the left and right images to the left and right images buffers located in the local memory (4). Buffers are organized according to the principle of double buffering. At least one channel transfers processing results to the external memory (2). The cores (5) of the DSP0-DSPn signal processors perform image pre-processing and video analytics tasks using the disparity map, placing the results of the calculations in the local memory (4). The hardware accelerator (8) computes the disparity map by placing it in the buffer in the local memory (4). Buffers for storing intermediate computation results are also located in the local memory (4); all buffers are organized according to the principle of double buffering. The arbiter (9) arbitrates the access of the cores (5) of the signal processors DSP0-DSPn and the hardware accelerator (8) to the local memory (4). Programming of the core registers (5) of the signal processors DSP0-DSPn and the accelerator (8) is performed by the central processor (10) via the system interface (11).

For each of the input images, a rectification procedure is performed in parallel with several of the n cores (5) of the signal processors DSP0-DSPn. The number of cores (5) of the signal processors involved in performing of the rectification is determined depending on the video analytics algorithms used. This amount can vary from 2 to n. In the described embodiment of the claimed invention, rectification is performed by four cores (5) of the signal processors DSP0-DSP3.

When performing the rectification, the internal parameters of the cameras are used, which are determined in advance at the calibration stage. These include:
camera matrix:

$$M = \begin{bmatrix} f_x & 0 & c_x \\ 0 & f_y & c_y \\ 0 & 0 & 1 \end{bmatrix},$$

where:

$f_x, f_y$—scale factors, which are usually equal to the frame size in pixels horizontally;

$c_x, c_y$—coordinates of the optical axis in the coordinates of the frame (the upper-left corner of the frame has coordinates (0, 0)).

distortion matrix:

$D = [k_1 k_2 p_1 p_2]$, where $k_1, k_2$—coefficients of the radial distortion of the first and second order;

$p_1, p_2$—coefficients of the tangential distortion of the first and second order;

During rectification, the image planes are transformed in such a way that the epipolar line of each pixel of one image is a horizontal line of pixels of another image with the same vertical coordinate. For this, based on the internal and external parameters of the camera (the latter are the relative rotation matrix R and the camera shift vector from each other), the rotation arrays R_left, R_right, to which each camera is to be rotated, and P_left, P_right, shall become new camera matrices, are determined respectively for the left and right cameras. Next, for a particular camera, we shall write R and P without indices. The matrix P is:

$$P = \begin{bmatrix} f'_x & 0 & c'_x \\ 0 & f'_y & c'_y \\ 0 & 0 & 1 \end{bmatrix}.$$

For fixed cameras, the above calculations are performed once, rectification requires directly changing the images in accordance with the known M, D, R and P.

Figure 2:
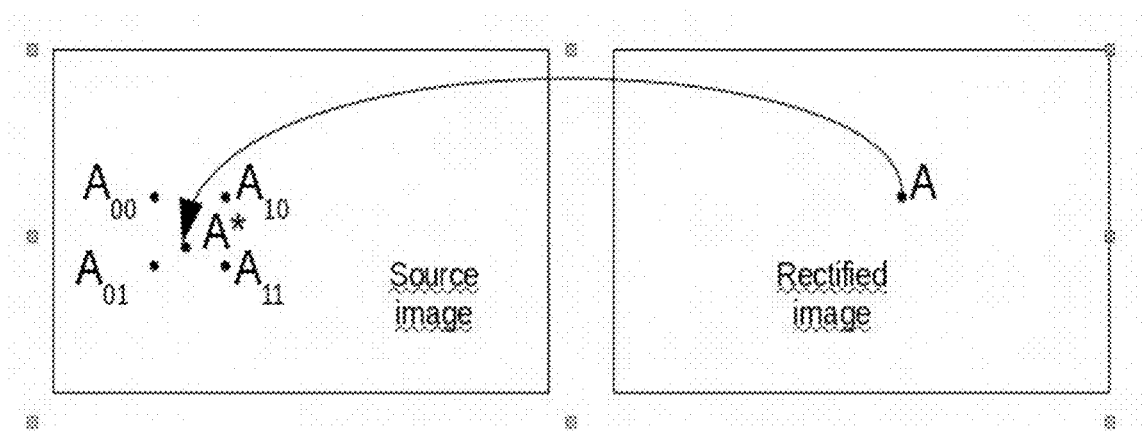
FIG. 2. Scheme of the prototype of the pixel in the original image according to the invention.

During rectification of the left image, the core (5) of the signal processor DSP0 calculates the coordinates of the prototypes of the pixels of the rectified image in the original image, as shown in FIG. 2. Calculations are performed according to the following formulas:

$x_p = (x - c'_x)/f'_x$ $y_p = (y - c'_y)/f'_y$ $[XYZ]^T = R_1^{-1} [x_p y_p 1]^T$ $x' = X/Z$ $y' = Y/Z$ $u = x'(1 + k_1 r^2 + k_2 r^4) + 2p_1 x' y' + p_2 (r^2 + 2x'^2)$ $v = y'(1 + k_1 r^2 + k_2 r^4) + 2p_2 x' y' + p_1 (r^2 + 2y'^2)$ $xs = u f_x + c_x$ $ys = v f_y + c_y$, where x, y—pixel coordinates in the rectified image frame;

x', y'—pixel coordinates after camera rotation;

$r^2 = x'^2 + y'^2$;

u, v—pixel coordinates after applying distortion to the image;

xs, ys—pixel coordinates in the original image.

The core (5) of the signal processor DSP0 writes a inverse pixel map to the local memory (4), in which each pixel of the rectified image corresponds to its prototype in the original image.

The core (5) of the signal processor DSP1 calculates the brightness of the rectified image pixels using a inverse pixel map from the local memory (4). Pixels are processed line by line from left to right. For each pixel of the rectified image with the coordinates (x, y) from the pixel map, the coordinates of its prototype in the input image (xs, ys) are read.

Since the xs and ys coordinates generally have a fractional value (see FIG. 2), in order to find the brightness value of the prototype, bilinear interpolation over four neighbouring pixels is used:

$(w_1, w_2) = (ys - y_{00}, xs - x_{00})$ $L(xs, ys) = w_1 w_2 L_{11} + (1 - w_1) w_2 L_{01} + w_1 (1 - w_2) L_{10} + (1 - w_1)(1 - w_2) L_{00}$, where $x_{00}, y_{00}$—coordinates of the point $A_{00}$;

A—pixel of the rectified image;

A—prototype of the A pixel in the original image;

$L(xs, ys), L_{11}, L_{01}, L_{10}, L_{00}$—brightness expressed in points A, $A_{11}, A_{01}, A_{10}, A_{00}$ The core (5) of the signal processor DSP1 reads the brightness values from the image buffer of the pixels $A_{11}, A_{01}, A_{10}, A_{00}$, calculates the brightness of the pixel with the coordinates (x, y) and writes it to the rectified image buffer.

The cores (5) of the DSP2-DSP3 signal processors perform the rectification procedure of the right image according to the algorithm described above. The buffers of the left and right rectified images contain several lines (at least 4) and can be organized according to the principle of double buffering.

A larger number of cores (5) of the DSP signal processors can perform a single image ratification. In this case, the first core (5) calculates a inverse pixel map, and the brightness of the pixels is calculated in parallel by the rest of the cores (5) of the DSP signal processors. The image line is divided into fragments, the number of fragments corresponds to the number of cores (5) of the DSP signal processor, each core (5) processes its part of the rectified image line.

The hardware accelerator (8) calculates an accurate disparity map according to the known semi-global stereo matching algorithm (SGBM) from the background, tests the left image disparity map with the help of the disparity map of the right image (Left-Right Check) and improves the resulting map by three-stage post-processing (peak detection, interpolation and median filtration). Calculation of an accurate map is carried out with the accumulation of cost in one or two directions—left and down—which allows to calculate the disparity of the image in one pass. Block clocking is carried out by a CLK clock signal.

Figure 3:
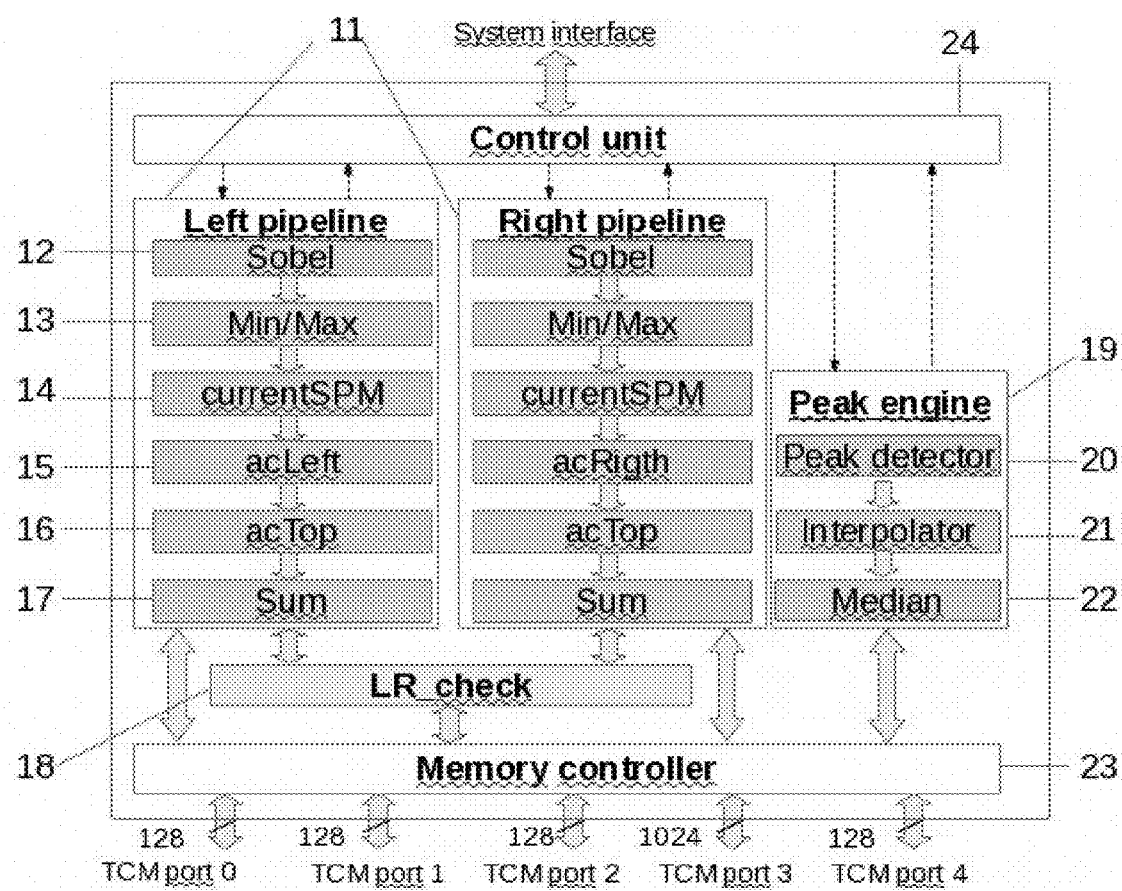
FIG. 3. Structural diagram of the hardware accelerator SGBM according to the invention.

FIG. 3 shows the block diagram of the hardware accelerator (8) SGBM. Data processing is performed by two parallel pipelines (11), Left pipeline and Right pipeline, each of which can calculate the values of the disparity map at the maximum possible disparity value—Number_of_Disparity (NoD) 127. If NoD<64, then the processing of the left and right images in one or two directions is performed in parallel with the maximum frequency of 2 CLK per pixel. If 64<=NoD<128, then both pipelines process the data of the left and right images to the right and down with the in 2 times smaller maximum frequency—4 CLK per pixel. In case if NoD>127, only the left image data is processed by both pipelines in the right and down directions at a rate of 4 CLK per pixel. Data processing in the down direction is always performed when processing only the left image.

Each processing pipeline consists of six processing blocks: Sobel filter block (12), Min/Max block (13), currentSPM block (14), acLeft/acRight block (15), acTop block (16), and Sum block (17). The Left-Right Check (18) block is used to check the disparity map of the left image using the right image disparity map. The post-processing of the primary disparity map is made by the Peak Engine block (19), and it consists of three stages implemented by the blocks Peak Detector (20), Interpolator (21) and Median (22).

Data exchange between the processing units and the local TCM memory is carried out via the Memory Controller (23) block through five independent Master ports. Port 0 is used to read the rectified image and write the image after its filtering by the Sobel filter. Port 1 is used to read the filtered image and write the results of calculating of the raw disparity map for the left and right images. Port 2 is used to read an raw disparity map for the left and right images and write an precise disparity map after the quality control. The data bus width for ports 0-2 is 128 bits. Port 3 is used to read and write accumulated values in the vertical direction. The width of the bus of port 3 is determined by the NoD value and can vary from 256 to 1024 bits. Port 4 is designed to read an precise disparity map (after LR-check) and write a dense map of disparity after post-processing. Control of the computational pipelines and the video memory port is performed by the Control unit (24), which contains the registers programmed by the central processor through the system interface.

The Sobel filtering unit (12) pre-filters the rectified image read from the local memory (4) using the Sobel filter. Intermediate filter results are written to the buffer of the filtered image located in the local memory (4).

In the Mi/Max block (13), the ends of the segments $[\min\{L(q'), L(q'+0.5), L(q'-0.5)\}; \max\{L(q'), L(q'+0.5), L(q'-0.5)\}]$ are calculated for the pixels q' of the left/right image (depending on the direction) with the horizontal coordinate pos and the vertical coordinate from Y−1 to y+2, where L is the pixel brightness. The left and right ends of the segments are written into regular arrays with the size of (NoD+1)*4. For boundary cases, the pos coordinates (the first and last column of the processing region) are considered to be degenerated to the point L(q).

Figure 4:
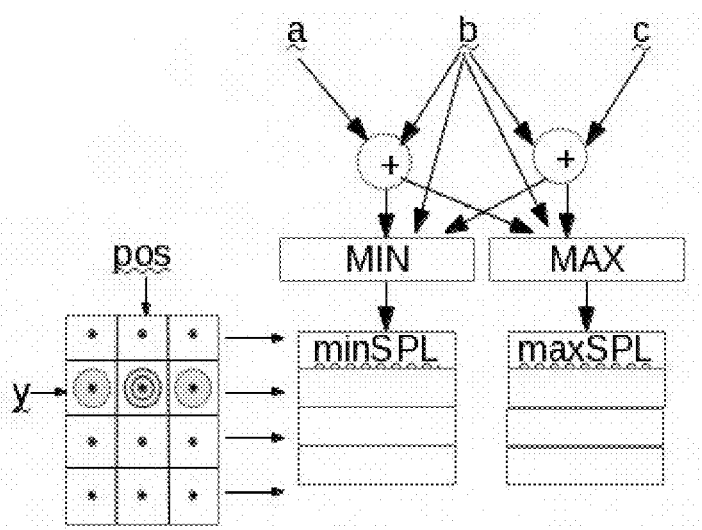
FIG. 4. Diagram of the Min/Max block operation algorithm according to the invention.
Figure 5:
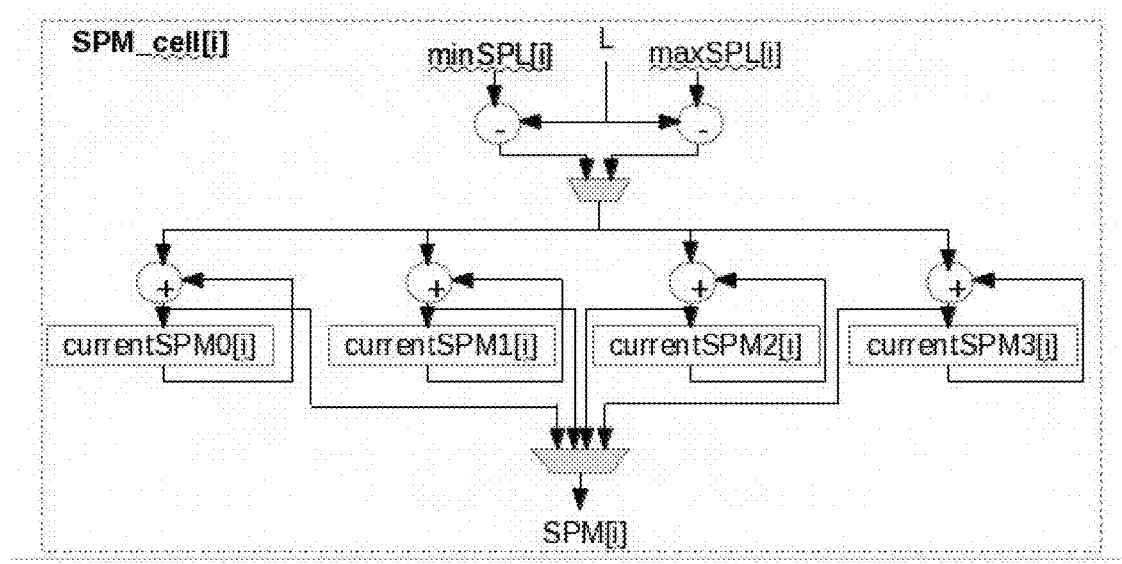
FIG. 5. Diagram of the cell of the currentSPM block according to the invention.

The pixel values of the four lines of the processing region filtered by the Sobel filter are read into the registers from the buffer of the filtered image in the local memory (4). To process one q pixel, 3 pixels of the filtered image are required—the q pixel itself and its adjacency, as shown in FIG. 4. The q pixel with coordinates (pos, y) is denoted by a double circle. The minimum and maximum are calculated from three values a, b and c (a is the pixel value with the horizontal coordinate pos−1, b—with the horizontal coordinate pos, c—with the horizontal coordinate pos+1). To obtain the brightness of the points (q+0.5) and (q−0.5), the arithmetic mean values are calculated:

$$L(q+0.5)=(c+b)>>1$$

$$L(q-0.5)=(a+b)>>1$$

The calculations are repeated for pixels with vertical coordinates y−1, y, y+1 and y+2. The result of the calculation is 4 minimum values, which are written to the minSPL/minSPR array), and 4 maximum values (which are written to the maxSPL/maxSPR array).

The currentSPM block (14) calculates the current 12-bit value of the matching cost function for the p pixel and NoD+1 disparity values. The values of NoD are determined in the range from 15 to 239 in increments of 16. C (p, d) is the matching cost for p pixel and disparity (the lower the matching cost C (p, d) is, the greater the probability that p pixel has a disparity d), and is calculated according to the following formula:

$$C(p, d) = \sum_{p' \in S} \min_{|\varepsilon| \leq 0.5} |L(p') - L(q' + \varepsilon)|$$

Here p' runs through the values of the aperture S—the neighborhood of the left (right) image around the p pixel. For the algorithm a neighborhood of five pixels (the pixel itself and all its neighbors along the edge) SGBM is used. q' is the pixel of the right (left) image, shifted by d relative to p', ε is a real number, q'+ε is the horizontal shift.

The calculation of the 12-bit values of the array currentSPM [0:NoD], where currentSPM[d]=C(p, d), is performed in the pipeline for the pixels of two lines at the same time. The block consists of 64 identical cells, each of which computes currentSPM values for one disparity value. Each cell processes 4 neighbouring pixels of two rows in the pipeline. The cell structure is shown in the FIG. 5. In case where NoD is less than 64, two cycles are required to calculate currentSPM for one pixel. If NoD is in the range from 64 to 128, the unit calculates disparity values in two consequent stages with a frequency of four cycles per pixel. If NoD>=128, the currentSPM blocks of the Left Pipeline and Right Pipeline (11) pipelines work in parallel, the Left Pipeline computes the currentSPM values for NoD<128 and the Right Pipeline—for NoD>=128.

In the acLeft/acRight blocks (15), the accumulated cost of matching in the horizontal direction for the left and right images is calculated, respectively, in acDown (16) blocks, the accumulated cost of matching is calculated in the downwards direction.

The accumulated cost in the r direction for p pixel and d disparity is denoted a Cr(p, d) and is recursively calculated according to the following formula:

$$Cr(p,d)=\min\{Cr(p-r,d),Cr(p-r,d+1)+P1,Cr(p-r,d-1)+P1,\min Cr(p-r,i)+P2\}+C(p,d)-\min Cr(p-r,i),$$

where P1 and P2 are the penalties for changing the disparity by 1 and a random number, respectively Min Cr(p-r, i) is the minimum on i (with i ranging from 0 to NoD−1).

Figure 6:
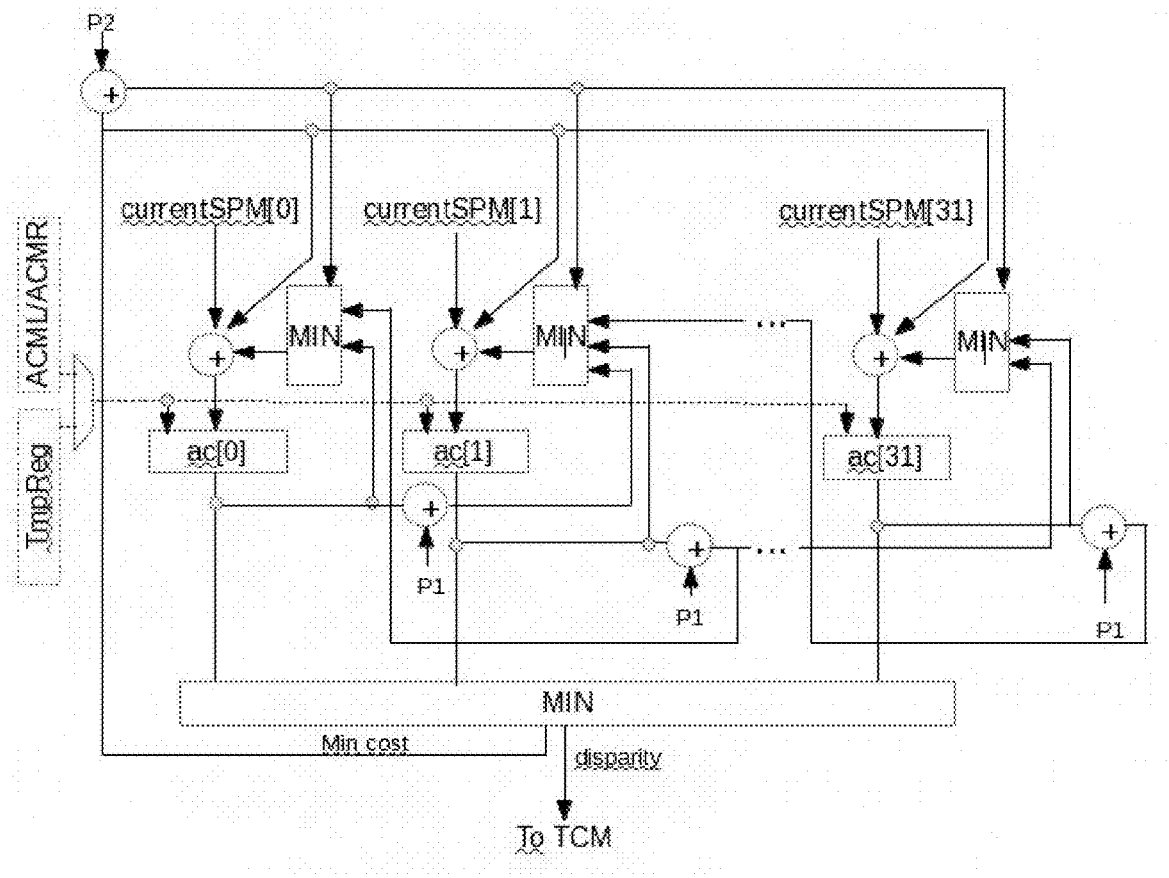
FIG. 6. Diagram of the cLeft/acRight/acTop blocks according to the invention.

The block structure for all directions is the same and is shown in FIG. 6. The block consists of 32 single-type cells and a block for calculating the minimum. The block calculates the accumulated value ac[d]=Cr(p, d) for 32 disparity values per 1 step. Intermediate results of calculations (accumulated matching cost) for left-right directions are stored in intermediate registers. For the downward direction—depending on the number of the line being processed: for even lines, the accumulated matching cost is stored in intermediate registers, for odd ones—in ACML/ACMR buffers. The ACML/ACMR buffers are allocated to the local memory (4). The size of the buffers is determined by length of the line of the disparity map and the maximum value of disparity (NoD).

The speed of data processing depends on NoD and corresponds to the processing speed of the currentSPM block. The accumulated matching cost for one pixel with NoD<64 is calculated in 2 steps, with 64<=NoD<128—in 4 steps. If NoD>128, the accumulated cost are calculated only for the left image (without the subsequent LR_check), while the acLeft and acRight blocks work in parallel, acLeft processes the disparity values from 0 to 127, acRight—from 128, calculations for one pixel are made in 4 steps. If accumulation does not occur in the downwards direction, the acLeft/acRight blocks form the final result (the disparity value corresponding to the minimum value of the accumulated matching cost), which is written to the buffers of the raw disparity map placed in the local memory (4).

The Sum block (17) calculates the final value of the accumulated matching cost in the horizontal and vertical directions and selects the disparity values that are written to the buffer of the uraw disparity map placed in the local memory (4).

The LR-check (18) block checks the quality of the raw disparity map by comparing the disparity maps obtained by processing the left and right images. Values of disparity, recognized as unreliable, are replaced by 255 (255 is a value that disparity cannot take in a natural way, since the maximum disparity is strictly less than 240). After checking, the disparity map for the right image is not saved. The disparity map for the left image is written to the buffer of the precise disparity map located in the local memory (4).

The Peak Engine pipeline (19) performs post-processing of the disparity map after the LR-check. The processing is performed in order to improve the obtained precise disparity map and includes three stages: peak detection, interpolation and median filtration. Both all stages of post-processing and each of them separately can be performed. The resulting dense disparity map obtained after the post-processing is written to the buffer of the dense disparity map in the local memory (4).

The Peak detector (20) block detects the peaks in the precise disparity map. A peak is a component of connectedness of bounded size (no more than MAX_PEAK_SIZE), in a graph peaks of which are the pixels of the resulting disparity map; edges between two pixels are placed if, firstly, they have a common edge (that is, they are neighbours horizontally or vertically), and, secondly, if their disparities differ by not more than 1. The disparity of the pixels belonging to the peaks is recognized as unreliable and is replaced by 254.

Figure 7:
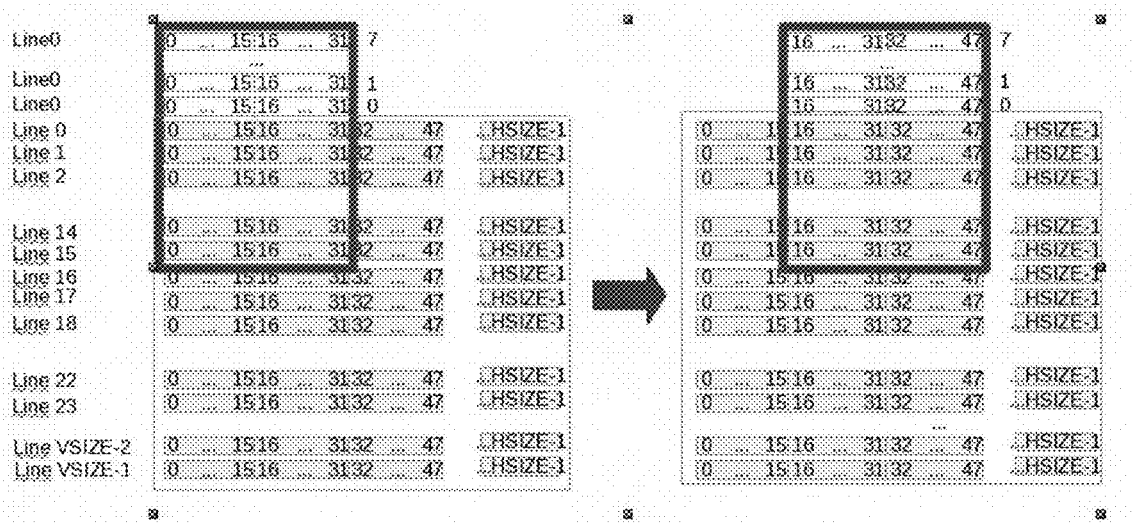
FIG. 7. Scheme of movement of the processing window during the detection of peaks according to the invention.

Detection of peaks is performed by a computational module made as a matrix of computational cells. The processing window of PD_W size horizontally and PD_H vertically (in the described variant, PD_W=32, PD_H=24) is moved along the input disparity map from left to right in increments of PD_W/2 (16) in the horizontal direction to the end of the line. During the first pass in the horizontal direction in the PD_H/3 (8) upper lines of the windows, the contents of the first line of the map are copied as shown in FIG. 7. If the length of the line is not a multiple of 16, when the window is moved to the last position in the horizontal direction, the missing pixels of the window are filled with the values 0xFF. After processing the first horizontal strip of the map, the window is returned to the beginning of the line, shifted down by 8 pixels and moved again to the end of the line. The algorithm is repeated to the end of the map. The last pass of the window in the horizontal direction is performed when the window is moved vertically and <=16 lines enter the window. During the last pass in the horizontal direction, 8 or more of the bottom lines of the window are filled with 0xFF.

The input map pixels corresponding to the current position of the processing window are transmitted from the input buffer to the input of the computational module, the peaks are detected, and the invalidate_pixels matrix (PD_H-2)× (PD_W-2) bit is put to the output of the computational module. Each pixel in the input map from the processing window (except the boundary area of 1 pixel) corresponds to the matrix bit invalidate_pixels. If the bit is set as a logical one, this pixel is invalid and its value is replaced by 254.

Figure 8:
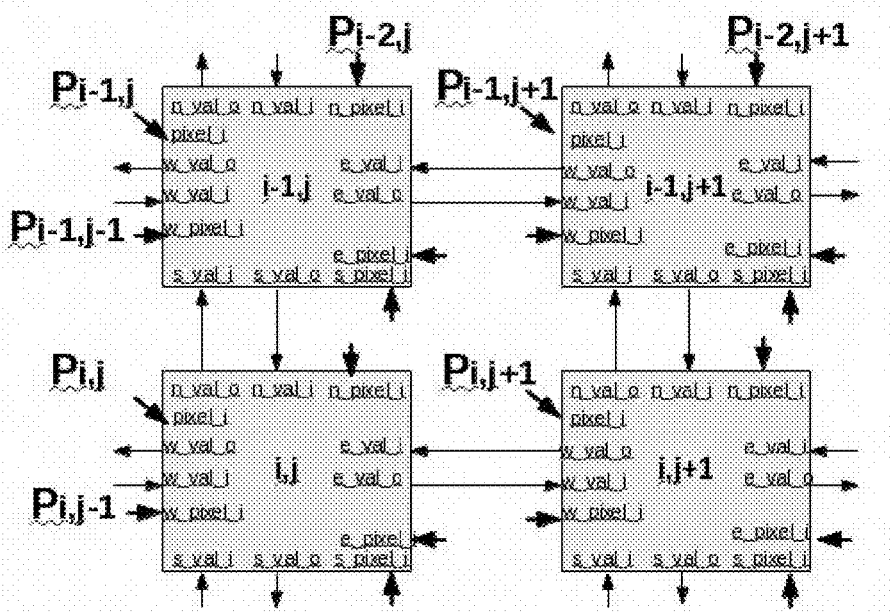
FIG. 8. Scheme of the matrix fragment of the computational cells of the peak detection unit according to the invention.

The computing module is a matrix of similar computational cells controlled by a single instruction, multiple data flow (SIMD). The number of cells corresponds to the number of pixels in the computational window (H×W). A fragment of the matrix of the computational cells is shown in FIG. 8. The input of each cell receives the pixel value corresponding to the position of this cell in the computational window (pixel_i), as well as the values of the neighbouring pixels on the left (w_pixel_i), on the right (e_pixel_i), at the bottom (s_pixel_i) and on the top (n_pixel_i). For cells located on the boundary of the matrix, instead of the value of neighbouring pixels, zeros are supplied.

Each cell stores the current state of current_value, which changes as a result of executing instructions. The initial value of current_value for all cells located not on the boundary of the matrix is 1. The initial value current_value of cells on the upper boundary of the matrix is specified by the parameter n_border_constant (in the described variant=16). The initial value of current_value of cells on the lower boundary of the matrix is specified by the parameter s_border_constant (in the described variant=16). The initial value of current_value of cells on the left border of the matrix (except for the upper and lower cells) is specified by the parameter w_border_constant (in the described variant=32). The initial value of the current_value of cells on the left border of the matrix (except for the upper and lower cells) is specified by the parameter e_border_constant (in the described variant=32).

Each cell has horizontal and vertical links with neighbouring cells in the matrix. As a result of the instructions implementation, four values are generated, which are fed to the inputs of the neighbouring upper cell (n_val_o), lower cell (s_val_o), left cell (w_val_o) and right cell (e_val_o). The output n_val_o of the cell i,j goes to the input s_val_i of the cell i−1,j. The output s_val_o of the cell i,j goes to the input n_val_i of the cell i+1,j. The output w_val_o of the cell i,j goes to the input e_val_i of the cell i,j−1. The output e_val_o of the cell i,j goes to the input w_val_i of the cell i,j+1. Inputs*_val_i of the boundary cells that do not have a neighbour are fed with zeros.

When the input data arrives, the cell analyses the possibility of the corresponding pixel belonging to the peak and its position in the peak region. The final decision on whether the pixel belongs to the peak is made after calculating the size of the region, which is a potential peak and comparing it with the parameter MAX_PEAK_SIZE.

A pixel potentially belongs to a peak region if its value differs from at least one neighbouring pixel from the left, right, top or bottom by more than 1. The cell calculates the signs of belonging to the peak in all directions:

If |pixel_i−w_pixel_i|<=1 w_similar=1, otherwise w_similar=0

If |pixel_i−e_pixel_i|<=1 e_similar=1, otherwise e_similar=0

If |pixel_i−n_pixel_i|<=1 n_similar=1, otherwise n_similar=0

If |pixel_i−s_pixel_i|<=1 s_similar=1, otherwise s_similar=0

Depending on the state of the characteristics, the position of the pixel in the potential peak region is determined: on the left (le), right (re), top (te) and bottom (be) boundaries, on the horizontal between the left and right boundaries (h), on the vertical between the upper and the lower boundaries (v). The cells in the upper row of the matrix are forced to receive the upper boundary (te_force) status. The cells in the bottom row of the matrix are forced to get the status of the upper boundary (be_force). The cells in the left row of the matrix (except the top and bottom) are forced to get the status of the left boundary (le_force). The cells in the right row of the matrix (except the top and bottom) are forced to get the status of the right boundary (re_force). Each cell can simultaneously have the status of several boundaries, simultaneously the status of a vertical and horizontal. A cell that has the status of a vertical and/or a horizontal cannot have the status of boundaries:

If (w_similar=0 и e_similar=1) or le_force=1 le=1, otherwise le=0

If (w_similar=1 и e_similar=0) or re_force=1 re=1, otherwise re=0

If (n_similar=0 и s_similar=1) or te_force=1 te=1, otherwise te=0

If (n_similar=1 и s_similar=0) or be_force=1 be=1, otherwise be=0

If (e_similar=1 и w_similar=1) h=1, otherwise h=0

If (n_similar=1 и s_similar=1) v=1, otherwise v=0

During cell processing, the cells execute a sequence of instructions; the result of the instruction for each cell depends on the status of this cell. Upon completion of the sequence of instructions, each cell forms the invalidate_pixel flag.

Figure 9:
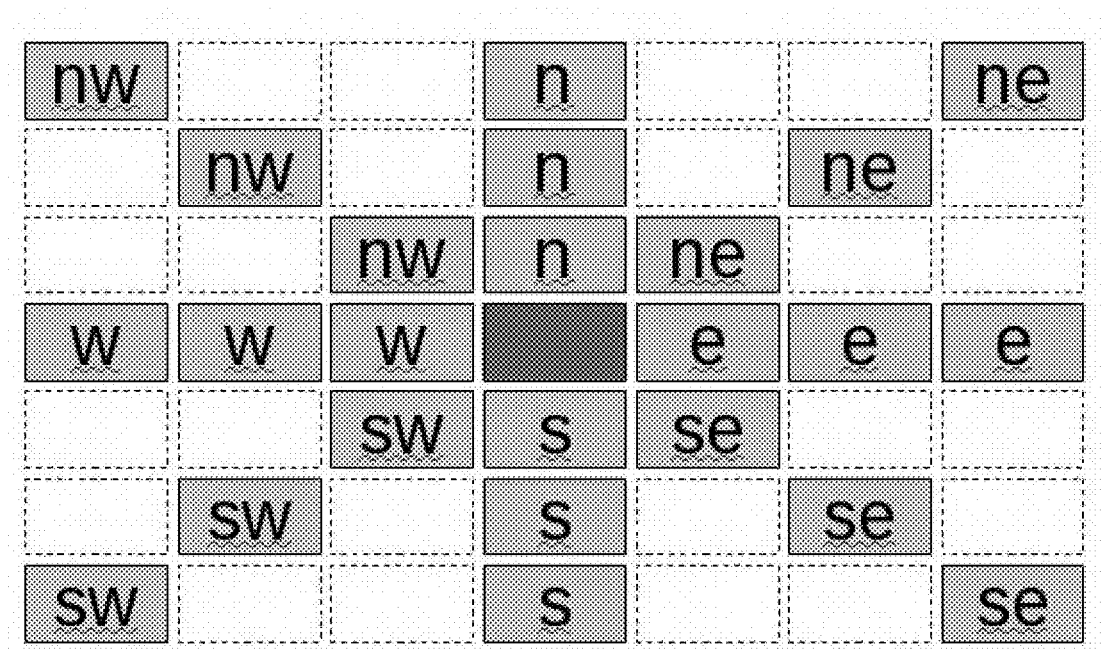
FIG. 9. Scheme of the core of the Interpolator block according to the invention.

The Interpolator block (21) calculates a dense disparity map by interpolating the disparity into pixels, the disparity of which during LR-check or peak detection was found to be unreliable and replaced by 254 or 255. Block cores are median filters on the nearest valid pixels from 8 directions, as shown in FIG. 9. The length of the rays in each direction can be from 1 to 8.

The block can perform the following types of interpolation:

anisotropic filtering, when, in order to receive a valid result, pixels shall be valid simultaneously in opposite directions in one of 4 pairs of opposite directions, this prevents "smearing" of objects in the uncertainty area. Additionally, heuristics can be included to reduce the number of generated "islands" in small areas of invalidity;

majority isotropic filtering, when directions are not taken into account, and, in order to produce a valid result, it is necessary that the valid pixels in the directions are greater than or equal to the specified number of NUM_VALID. When NUM_VALID=0, the majority isotropic filtering is turned off. The value NUM_VALID, other than zero, specifies the minimum number of valid pixels from the "rays", so that the result of the median is considered valid. When the majority isotropic filtering is turned on, anisotropic filtering is turned off.

The interpolation block performs parallel processing of N pixels from N lines (in the described variant N=8). The maximum length of the rays in all directions is also equal to N. The data band with the size of PD_H=3*N lines from the output of the peak detection block are transmitted to the interpolation block input. The interpolation window with the size of 3*N×(2*N+1) is moved along the strip of the disparity map processed by the peak detection block from left to right horizontally in increments of 1 pixel. The missing pixels for interpolation are replaced by the value 0xFF on the left and right.

The output of the interpolation block receives a filtered data band with the size of N pixels, corresponding to the lines of input data with N to 2*N−1 plus one pixel of top lines (2*N) and bottom lines (N−1) of the unfiltered map to perform the median filtering.

The Median block (22) performs the median filtering of the disparity map obtained. The size of the median filter window is fixed and is 3×3. The filtration can have from 0 to 8 stages. Each stage represents 8 median filters with a 3×3 window that perform parallel processing of pixels from 8 adjacent lines.

A dense disparity map is written by the Peak Engine pipeline (19) to the buffer of the dense disparity map of the local memory (4).

Figure 10:
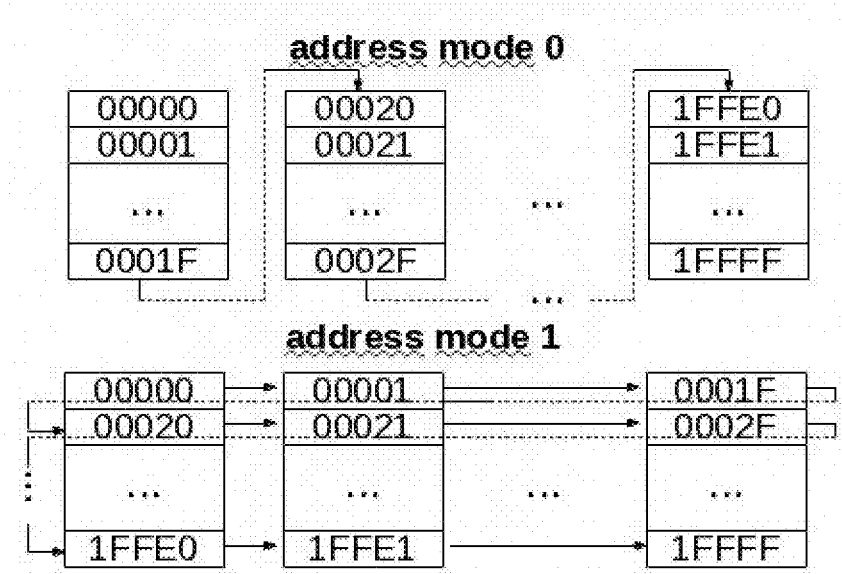
FIG. 10. Scheme of the addressing modes of the local TCM memory according to the invention.

The local memory (4) stores data shared by the DMA controller (3), the cores (5) of the DSP0-DSPn signal processors and the hardware accelerator (8). The local memory (4) consists of N banks (in the described variant N=32). All banks have the same volume and bit capacity (in the described variant 4K 128 bit cells). When accessing the local memory (4), two addressing modes can be used, which are illustrated in FIG. 10. The cores (5) of the DSP signal processors and the DMA controller (3) can use both addressing modes, the hardware accelerator (8)—only the addressing mode 0. All devices, except the hardware accelerator port (8), during one read/write operation, refer to one bank of the local memory (4); the data capacity in such operations is equal to the bank's capacity (128). Port 3 of the hardware accelerator (8) can simultaneously read/write from/to several banks of the local memory (4), the data capacity in such operations can be from 256 to 1024.

The arbiter (9) decodes the address and determines the bank of the local memory (4), to which the call is made. Arbitration is carried out independently for each bank. Fixed priorities are used in arbitration: the highest priority is set for the hardware accelerator port 3 (8), then the remaining hardware accelerator ports (8) in ascending order of numbering, the DMA controller (3), the core (5) of the DSP signal processors in ascending order of numbering.

Figure 11:
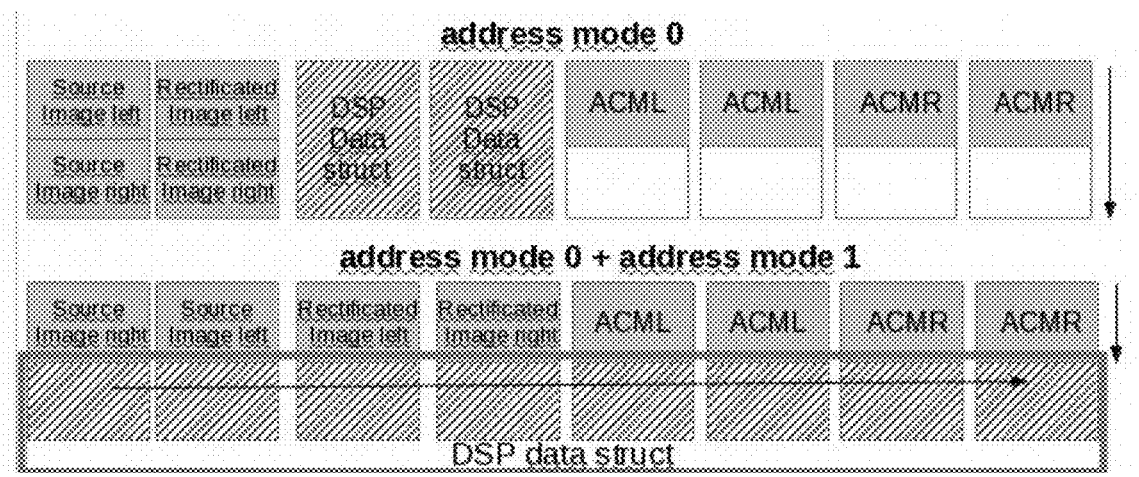
FIG. 11. Diagram of an example of the buffer allocation in the local TCM memory according to the invention.

The ACML/ACMR buffers are located in several banks of the local memory (4), and the number of cells in each bank is the same and is determined by the length of the image line. During one operation, the banks of the same number are accessed at the same time. The highest priority of port 3 guarantees simultaneous execution of read/write operations from all banks. Since there are strict requirements for the placement of the ACML/ACMR buffers, there may be problems with the efficiency of memory usage. The presence of two addressing modes provides additional flexibility. FIG. 11 shows two options for allocating the buffers. The arrows indicate the direction of the address incrementing. In the first variant, only the addressing option 0 is used, while the memory areas in the second half of the banks, in which ACML/ACMR are located, can be used to store only small data structures or remain unused. In the second variant, all the buffers used by the hardware accelerator (8) or shared by the hardware accelerator (8) and the DSP signal processor cores (5) have addressing mode 1, and the data structures used by the DSP signal processors (5) only have an addressing mode 0. The second half of the memory has a continuous address space and can be used to store data structures of a sufficiently large volume.

Another function of the arbiter (9) is the hardware data synchronization in the buffers between the cores (5) of the DSP signal processors, hardware accelerator (8) and the DMA controller (3). The synchronization is carried out using the K-bit register EVENT, where K is the number of the synchronized events.

For example, synchronization of the hardware accelerator (8) with the core (5) of the DSP signal processor for the data exchange via the rectified left image buffer is performed using the SL bit of the EVENT register in the following sequence:

the core (5) of the DSP signal processor analyses the SL bit. When SL is reset to 0, it starts rectification and writes the data to the rectified left image buffer.

after the data is written to the rectified left image buffer, the DSP signal processor core (5) sets the SL bit to 1.

the hardware accelerator (8) analyses the SL bit. When SL is set to 1, it starts processing data from the rectified left image buffer.

after the data from the rectified left image buffer is processed, the accelerator resets the SL bit to 0.

All synchronized devices can read the contents of this register on the EVENT bus, and also set and clear the bits of this register using the control bus. The two high-order bits of this bus determine the operation that must be performed with the EVENT register bit (0x—no operation, 10—bit reset, 11—bit setting), the low bits specify the bit number.

In the described variant, 4 out of 8 cores (5) of the DSP signal processors perform the rectification of the left and right images. The free resources of the core (5) of the DSP signal processor, used for rectification, and the remaining 4 cores (5) of the DSP signal processor can perform the tasks of pre-processing the input images prior to rectification and joint postprocessing of the rectified image and the disparity map calculated by the hardware accelerator (8). Such algorithms include:

converting the format of the input images;
converting the colors of the input images;
scaling of the input images;
filtering of the input images;
segmentation of the disparity map;
selection of singular points and objects on the disparity map;
joint segmentation of the rectified image by brightness, color and disparity map;
joint detection of special points and objects on the rectified image and disparity map;
segmentation of objects on the rectified image with the subsequent filtration on the distance on the disparity map;
detection of special points on the rectified image, followed by filtering along the distance on the disparity map;
estimation of the distance to special points and objects on the rectified image on the disparity map;
detection of the objects that are closer to the given distance in relation to the stereo system (crossing of the "virtual wall");
accumulation of a statistical background during the sequential processing of the images on the left channel, the right channel and the resulting disparity map, implementation of segmentation of changing areas of motion, tracking of moving objects with increased segmentation quality due to the depth obtained in the hardware accelerator (8);
semantic classification of objects in view of the stereo system using machine learning algorithms such as a random forest tree, Haar classifier, the decision rule by the support vector machine method, where during the training and classification phase, the signs calculated with the depth map are used;
implementation of localization algorithms in the SLAM (simultaneous localization and mapping) space in stand-alone devices (for example, robots).

While the foregoing embodiment has been set forth to illustrate the present invention, it will be appreciated by those skilled in the art that various modifications, additions and substitutions are possible without departing from the scope and spirit of the present invention disclosed in the appended claims.

The invention claimed is:

1. A method for stereo image processing in which:
   left and right source images are loaded line by line using a DMA controller from external memory into local memory buffers;
   the left and right source images are processed line by line using cores of signal processors, while their rectification is being performed, and the rectified left and right images are written to the buffers of the local memory;
   a disparity map is computed, using a hardware accelerator using the rectified left and right images, and is written to the local memory buffer, wherein detecting peaks in the disparity map is carried out in parallel for all pixels in a processing window of a predetermined size, and wherein the disparity map is interpolated after detecting the peaks by median filtering on nearest valid pixels of eight directions with a programmable length of the rays according to an anisotropic filtering algorithm or a major isotropic filtering; and
   the rectified left and right images are processed, using the cores of the signal processors, using the disparity map to create processed pixel-related information data structures that are written to the local memory and then unloaded with the use of the DMA controller into the external memory.

2. The method of claim 1 distinguished by the local memory buffers, in which the images and the disparity map are stored, having a size of several lines of the image, and are organized on the principle of double buffering.

3. The method of claim 1 distinguished by the fact that the rectification of the left and right source images is performed, the coordinates of the prototypes of the rectified image, pixels in the original image are calculated, and the brightness of the prototypes of the pixels is calculated by bilinear interpolation over the four neighbouring pixels.

4. The method of claim 1 distinguished by the fact that the semi global block matching algorithm (SGBM) is calculated in two directions, while calculating the matching cost function and the accumulated cost in each direction, while checking the disparity map of the left image based on the disparity map of the right image and performing the post-filtration of the disparity map, consisting of three stages: peak detection, interpolation, and median filtration.

5. The method of claim 1 distinguished by the fact that the synchronization of the devices using the local memory is performed using hardware and an event register.

6. The method of claim 1 distinguished by the fact that the rectification of the left and right source images is performed in parallel.

7. The method of claim 1 distinguished by the fact that the rectification of the left and right source images is performed simultaneously with correction of radial and tangential distortions of the first and second orders.

8. The method of claim 1 distinguished by the fact that the disparity map is computed, while two lines of the image are processed concurrently, with intermediate results stored in the local memory only for odd lines.

9. The method of claim 1 distinguished by the fact that the median filtering of a dense disparity map is performed in several successive stages, during each of which parallel processing of pixels from several adjacent image lines is performed using a median filter group.

10. A stereo image processing device comprising several cores of signal processors and a hardware accelerator connected via an arbiter to local memory, a DMA controller, a program cache and a data cache, while the cores of the signal processors and the hardware accelerator are connected to an external system interface and are configured to exchange data therethrough under the control of an external central processing unit, and the DMA controller, the program cache and the data cache are connected to the external memory and configured to exchange data, while
- the arbiter is configured to control the access of the device to the external memory;
- the DMA controller is configured to transfer data between the device and the external memory, while loading the left and right source images from the external memory line by line into the local memory buffers;
- the cores of the signal processors are configured to process line by line the left and right source images, while rectifying them and writing the rectified left and right images to the buffers of the local memory;
- the hardware accelerator is configured to calculate the disparity map, using the rectified left and right images, and, write it to the local memory buffer, wherein the hardware accelerator comprises left and right image pipelines containing a matching cost function calculating unit and an accumulating cost calculating unit that are configured to simultaneously calculate left and right disparity maps or are combined into one device for processing the left disparity map, a unit for checking the disparity map of the left image using the disparity map of the right image, a post-processing unit of the disparity map containing a peak detection unit, an interpolation unit, a median filtering unit, as well as a control unit, and wherein the interpolation unit is configured to perform parallel processing of N pixels of N lines, wherein the maximum length of the rays in all directions is N;
- the cores of the signal processors are designed to process the rectified left and right images the disparity map to create processed pixel-related information data structures and to write the data structures to the local memory; and
- the DMA controller is configured to unload the data structures from the local memory to the external memory.

11. The device of claim 10 distinguished by the fact that the local memory is made as banks of the same volume and bit capacity, access to which can be obtained both by transactions to one bank with a capacity equal to the bank's capacity and transactions to several banks simultaneously with a bit capacity equal to the total bit capacity of several banks, using two addressing modes under the control of the arbiter, configured with the possibility of arbitration to each bank independently with fixed priorities.

12. The device of claim 10 distinguished by the fact that the unit for calculating the matching cost function is made as an array of the same cells that are configured to process several lines of the image in the pipeline, while the processing time of one pixel can vary several times depending on the maximum disparity values.

13. The device of claim 10 distinguished by the fact that the calculation of the accumulated matching cost in the horizontal and vertical directions is performed by identical blocks consisting of an array of the same cells and a unit for calculating the minimum, while the number of successive processing steps varies depending on the maximum disparity value.

14. The device of claim 10 distinguished by the fact that the peak detection unit is a computational module that is a matrix of similar computational cells controlled by a single instruction, multiple data (SIMD) flow, in which the number of cells corresponds to the number of pixels in the computational window, each cell is configured with the possibility of obtaining a pixel value corresponding to the position of this cell in the computational window, as well as the values of neighbouring pixels on the left, right, bottom and top, with the ability to store the current value, which changes as a result of the execution of instructions and completion of the sequence of instructions for the formation of the sign invalidation.

15. The device of claim 10 distinguished by the fact that the median filtering unit is made as several consecutive processing steps, each of which performs parallel processing of pixels from several lines.

16. The method of claim 4 distinguished by the fact that the peak detection is performed using a computational module that is a matrix of similar computational cells controlled by a single instruction, multiple data (SIMD) flow, in which the number of cells corresponds to the number of pixels in the computational window, each cell is configured with the possibility of obtaining a pixel value corresponding to the position of this cell in the computational window, as well as the values, of neighbouring pixels on the left, right, bottom and top, with the ability to store the current value, which changes as a result of the execution of instructions and completion of the sequence of instructions for the formation of the sign of invalidation.

* * * * *